US011055077B2

(12) United States Patent
Krishnamoorthy

(10) Patent No.: US 11,055,077 B2
(45) Date of Patent: Jul. 6, 2021

(54) DETERMINISTIC SOFTWARE CODE DECOMPILER SYSTEM

(71) Applicant: BANK OF AMERICA CORPORATION, Charlotte, NC (US)

(72) Inventor: Madhusudhanan Krishnamoorthy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/707,867

(22) Filed: Dec. 9, 2019

(65) Prior Publication Data
US 2021/0173624 A1 Jun. 10, 2021

(51) Int. Cl.
G06F 9/44 (2018.01)
G06F 9/445 (2018.01)
G06F 8/53 (2018.01)
G06F 11/36 (2006.01)
G06F 8/30 (2018.01)

(52) U.S. Cl.
CPC .................. G06F 8/53 (2013.01); G06F 8/30 (2013.01); G06F 11/3624 (2013.01)

(58) Field of Classification Search
CPC ........... G06F 8/30; G06F 8/53; G06F 11/3624
See application file for complete search history.

(56) References Cited

U.S. PATENT DOCUMENTS

| 7,237,224 | B1* | 6/2007 | Motoyama | ................ G06F 8/10 717/106 |
| 7,565,631 | B1 | 7/2009 | Banerjee et al. | |
| 8,429,628 | B2 | 4/2013 | Spurlin | |
| 8,510,713 | B1* | 8/2013 | Ormandy | ............ G06F 11/3688 717/124 |
| 8,930,884 | B2 | 1/2015 | Joukov et al. | |
| 10,133,649 | B2 | 11/2018 | Li et al. | |
| 10,394,554 | B1 | 8/2019 | Healey | |
| 10,656,940 | B1* | 5/2020 | Hogan | ..................... G06N 3/02 |
| 2010/0066735 | A1* | 3/2010 | Givon | ..................... G06F 3/011 345/419 |
| 2010/0299657 | A1* | 11/2010 | Barua | ..................... G06F 8/456 717/136 |
| 2015/0363197 | A1 | 12/2015 | Carback et al. | |
| 2016/0147517 | A1* | 5/2016 | Vicovan | .............. G06F 11/3636 717/140 |

(Continued)

OTHER PUBLICATIONS

Aylin Caliskan, When Coding Style Survives Compilation: De-anonymizing Programmers from Executable, 2017, pp. 1-15. https://arxiv.org/pdf/1512.08546.pdf, (Year: 2017).*

(Continued)

Primary Examiner — Mongbao Nguyen
(74) Attorney, Agent, or Firm — Michael A. Springs; Moore & Van Allen PLLC; Nicholas C. Russell

(57) ABSTRACT

A system for decompiling one or more codes includes a memory operatively coupled to a processor. The system is configured for extracting a binary code and one or more inputs associated with the binary code, disassembling the binary code into a first assembly language code based on the one or more inputs, converting the first assembly language code into first set of fixed dimension vectors, generating a skeleton code from the first set of fixed dimension vectors, optimizing the skeleton code, and generating a high level code.

18 Claims, 7 Drawing Sheets

(56) References Cited

U.S. PATENT DOCUMENTS

2018/0068121 A1* 3/2018 Gray .................. G06F 8/53
2019/0265955 A1* 8/2019 Wolf .................. G06N 3/084
2020/0394028 A1* 12/2020 Byrne ................. G06F 8/52

OTHER PUBLICATIONS

Yongjun Lee, Instruction2vec: Efficient Preprocessor of Assembly Code to Detect Software Weakness with CNN, 2019, pp. 1-14. https://www.mdpi.com/2076-3417/9/19/4086 (Year: 2019).*
M. Ammar Ben Khadra, Speculative disassembly of binary code, 2016, pp. 1-10. https://dl.acm.org/doi/pdf/10.1145/2968455.2968505 (Year: 2016).*

* cited by examiner

DETERMINISTIC SOFTWARE CODE DECOMPILER SYSTEM

BACKGROUND

Conventional systems do not have the capability to decompile binary codes that do not have a source code. As such, there exists a need for a system to efficiently decompile binary codes.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for efficiently decompiling binary codes. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention extracts a binary code and one or more inputs associated with the binary code, disassembles the binary code into a first assembly language code based on the one or more inputs, converts the first assembly language code into first set of fixed dimension vectors, and generates a skeleton code from the first set of fixed dimension vectors.

In some embodiments, the present invention compiles the skeleton code.

In some embodiments, the present invention in response to compiling the skeleton code, determines one or more errors associated with the skeleton code and corrects the one or more errors associated with the skeleton code.

In some embodiments, the present invention corrects the one or more errors based on converting the skeleton code to a second assembly language code and a second set of fixed dimension vectors and comparing the second set of fixed dimension vectors with the first set of fixed dimension vectors.

In some embodiments, the present invention determines a mismatch between the second set of fixed dimension vectors and the first set of fixed dimension vectors based on comparing the second set of fixed dimension vectors with the first set of fixed dimension vectors and optimizes the second set of fixed dimension vectors by correcting the mismatch between the second set of fixed dimension vectors and the first set of fixed dimension vectors.

In some embodiments, the present invention determines a match between the second set of fixed dimension vectors and the first set of fixed dimension vectors based on comparing the second set of fixed dimension vectors with the first set of fixed dimension vectors and in response to determining the match, generate a high level code.

In some embodiments, the one or more inputs comprise at least compiler information associated with the binary code.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
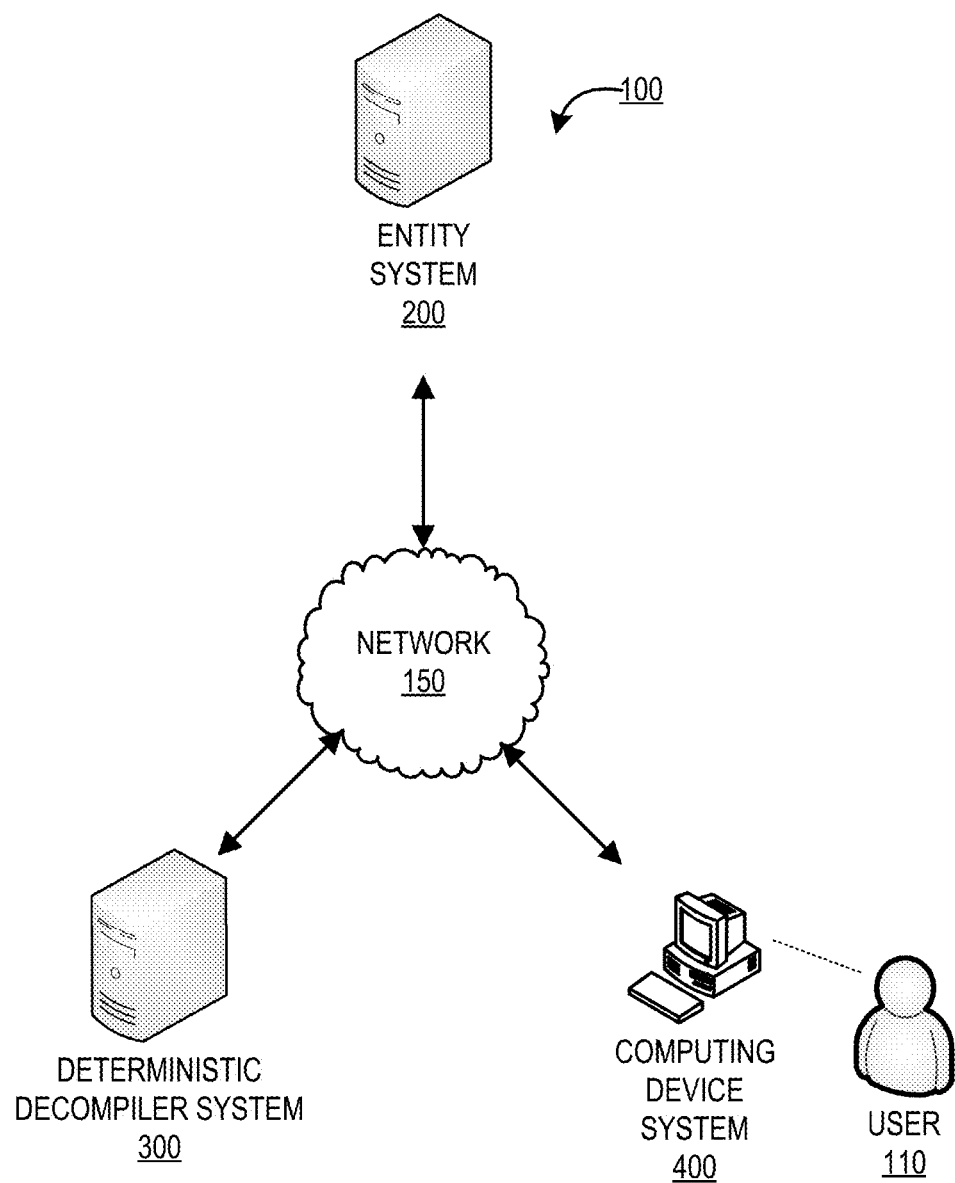
Figure 2:
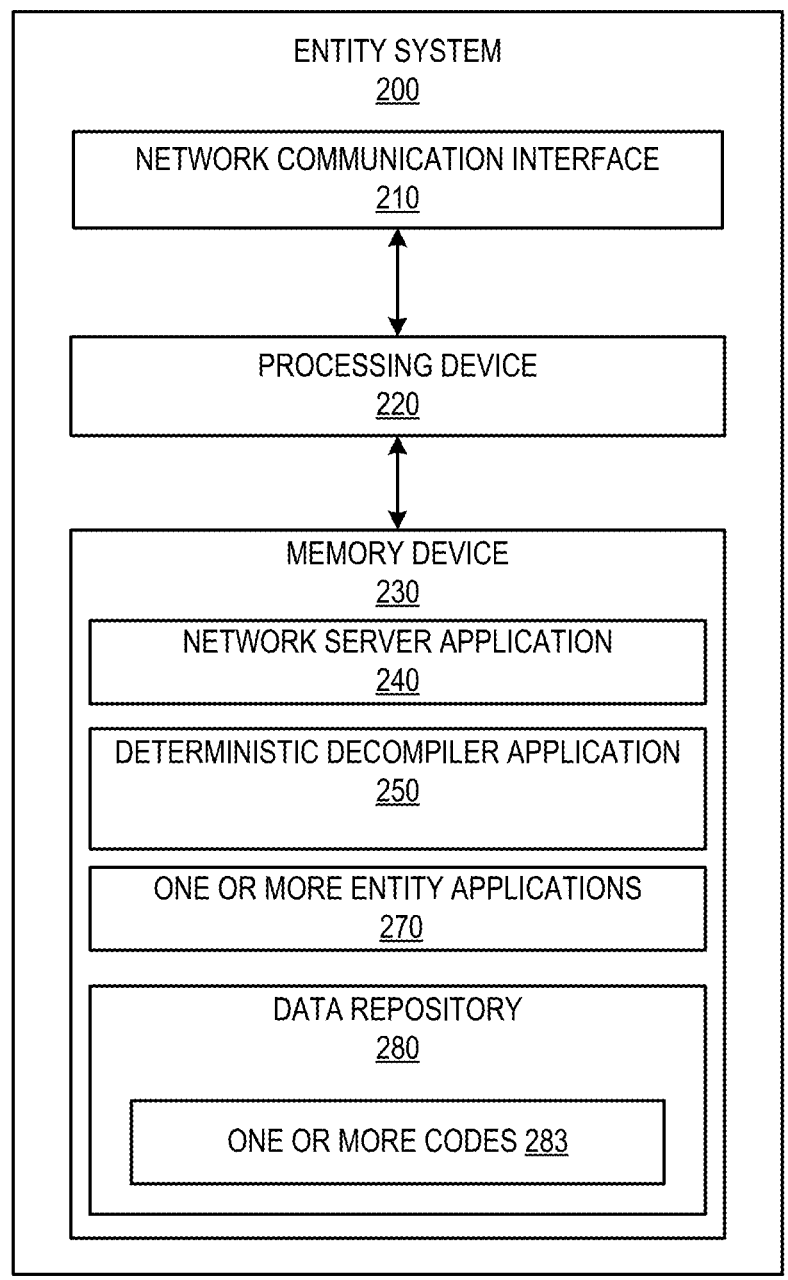
Figure 3:
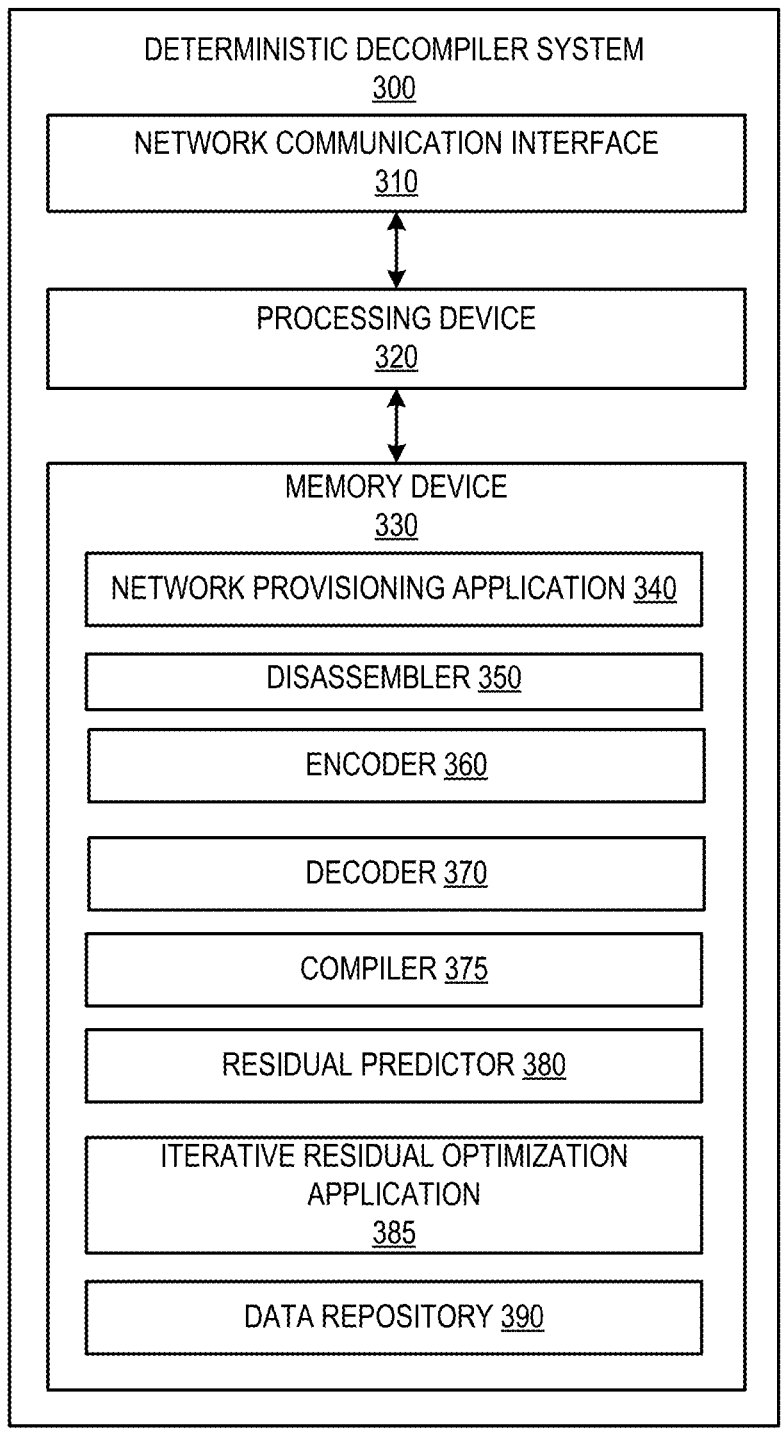
Figure 4:
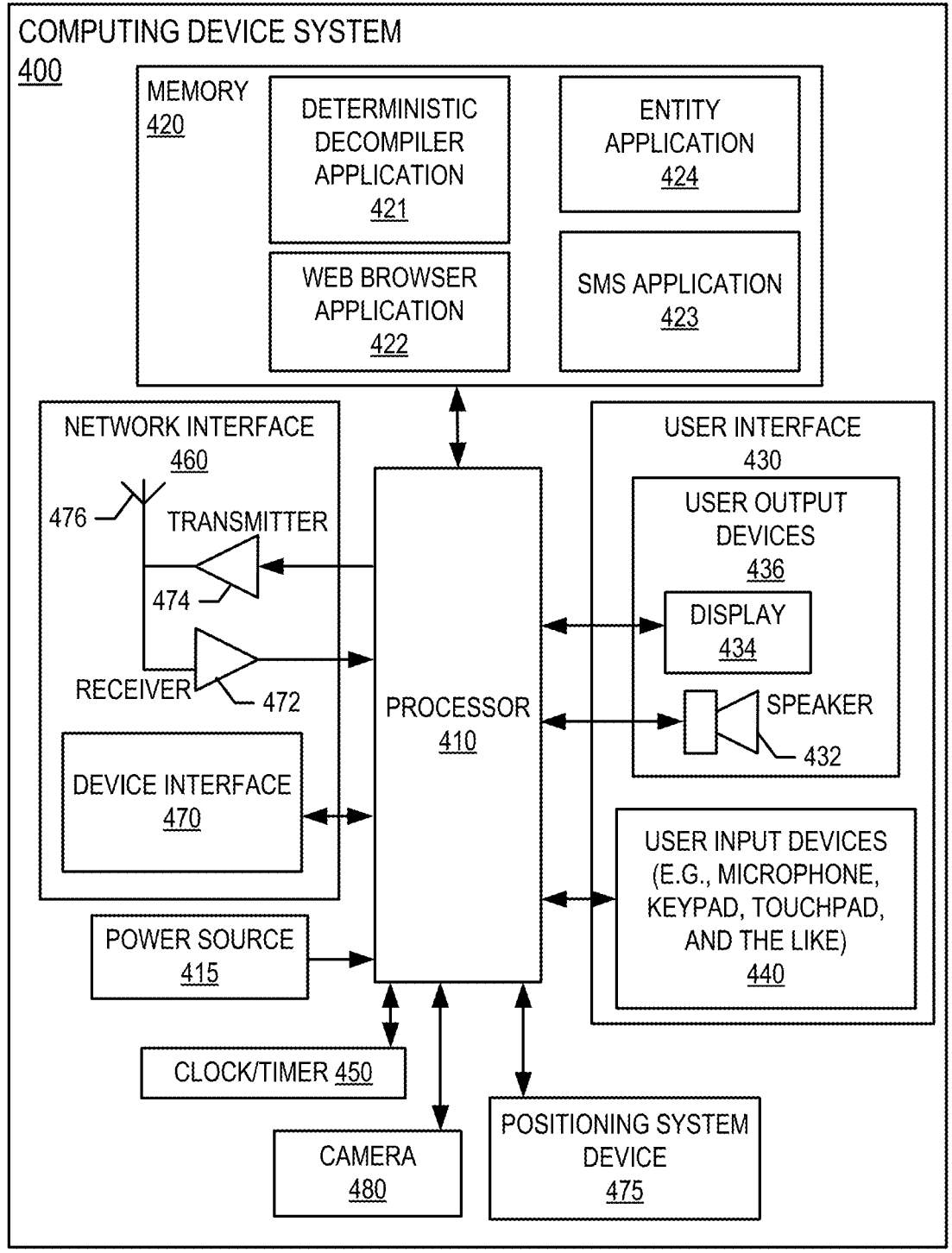
Figure 5A:
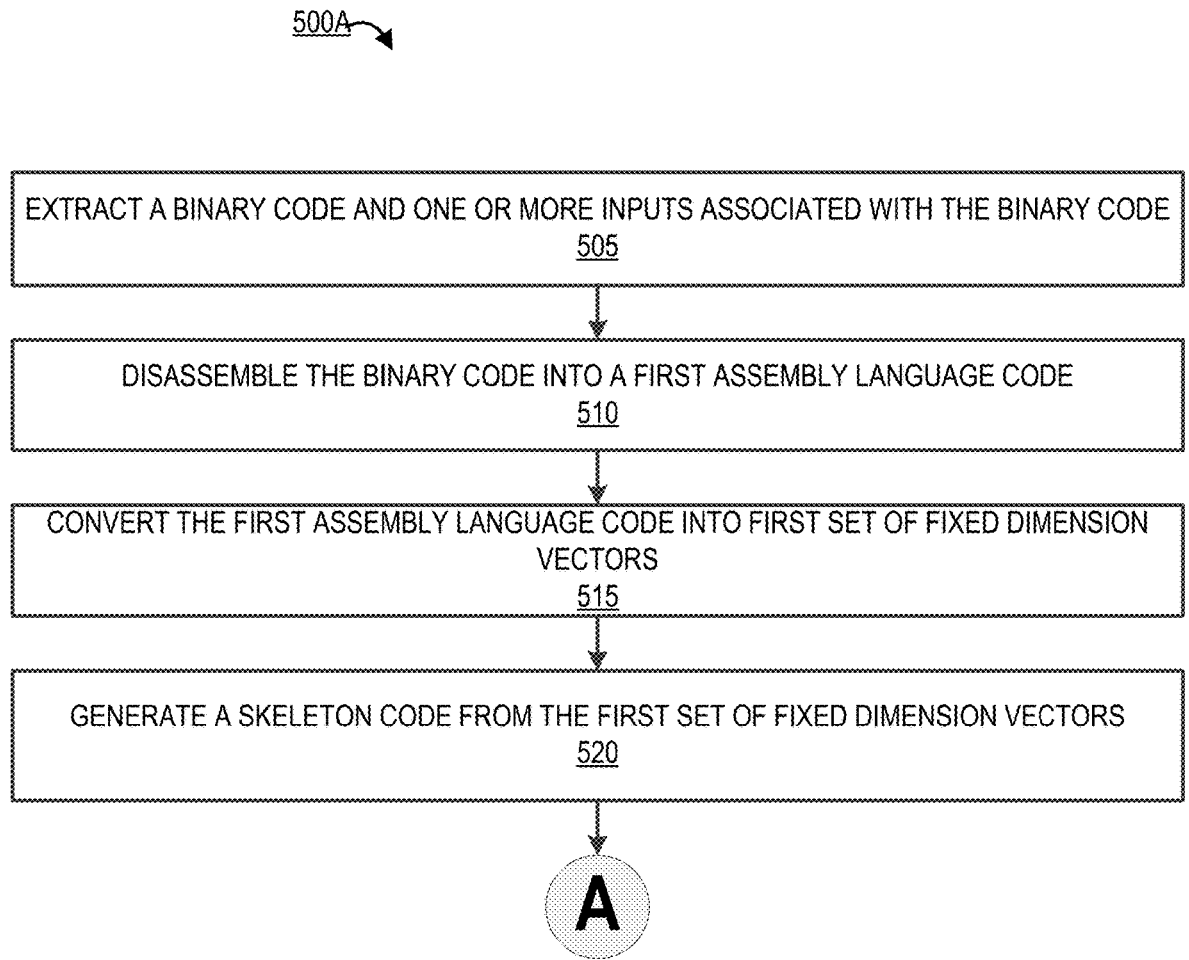
Figure 5B:
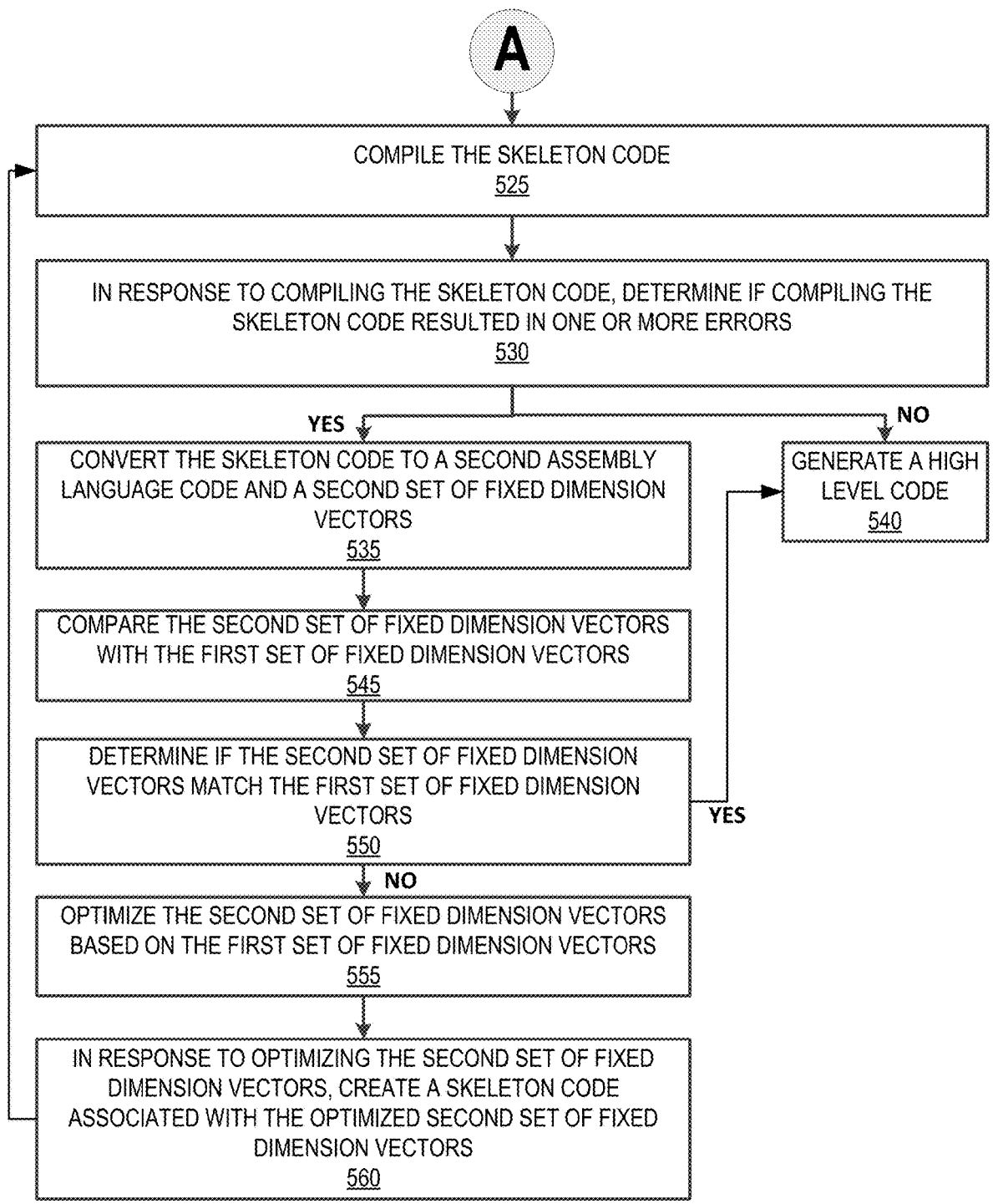
Figure 6:
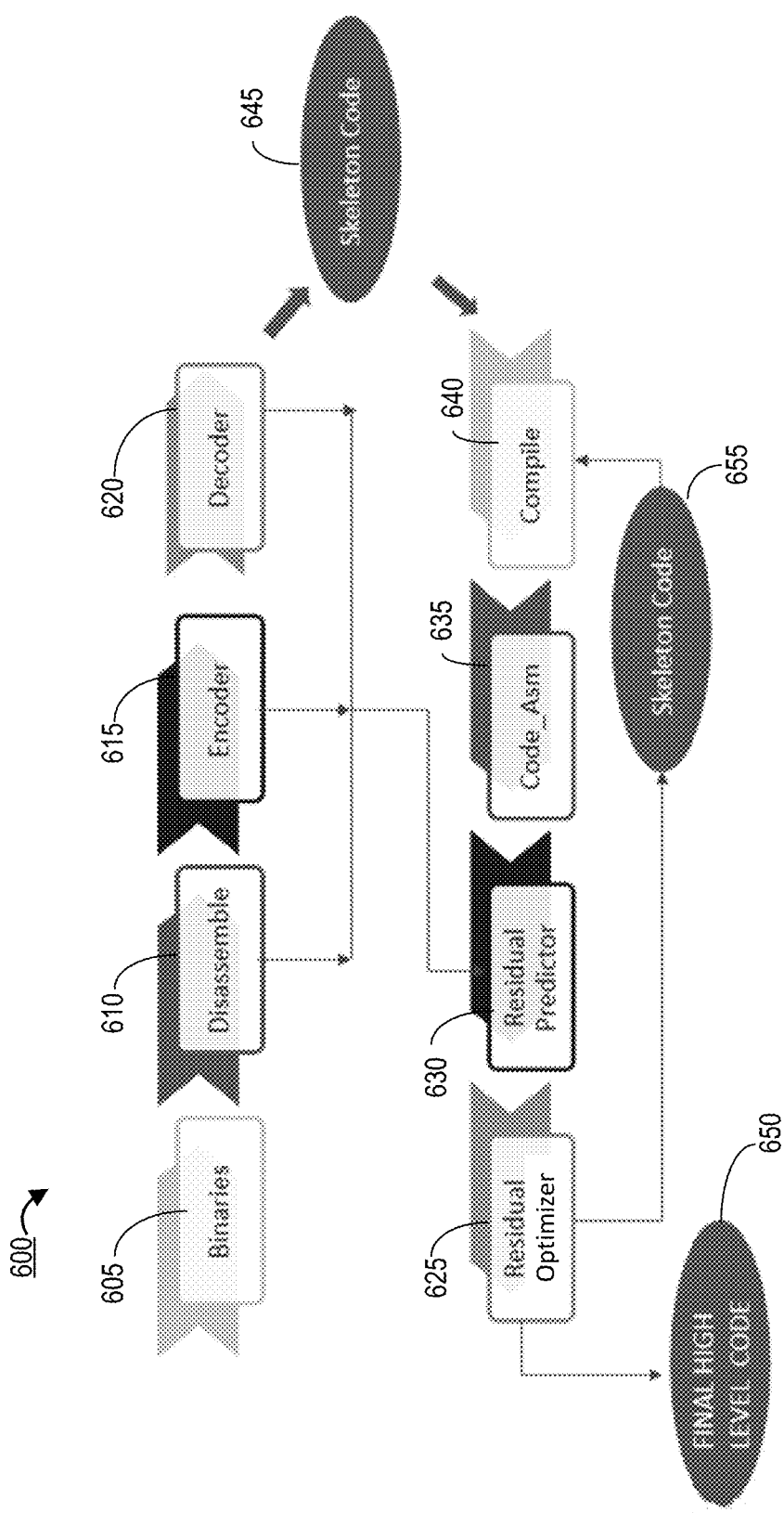

Having thus described embodiments of the invention in general terms, reference will now be made the accompanying drawings, wherein:

FIG. 1 provides a block diagram illustrating a system environment for efficiently decompiling binary codes, in accordance with an embodiment of the invention;

FIG. 2 provides a block diagram illustrating the entity system 200 of FIG. 1, in accordance with an embodiment of the invention;

FIG. 3 provides a block diagram illustrating a deterministic decompiler system 300 of FIG. 1, in accordance with an embodiment of the invention;

FIG. 4 provides a block diagram illustrating the computing device system 400 of FIG. 1, in accordance with an embodiment of the invention;

FIGS. 5A and 5B provide a flowchart illustrating a process flow for efficiently decompiling binary codes, in accordance with an embodiment of the invention; and FIG. 6 provides a block diagram illustrating the decompiling process, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the example embodiments and implementations described herein contemplate interactions engaged in by a user with a computing device and/or one or more communication devices and/or secondary communication devices.

A "user", as referenced herein, may refer to an entity or individual that has the ability and/or authorization to access and use one or more resources provided by an entity or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, as new technologies and programming languages emerge, modernizing existing applications by adapting to new technologies and programming languages is eminent. However, existing applications may be old and may just contain the binary code that was generated after executing the source code. When modernizing the existing applications, existing systems typically require a source code to modernize them and even in such a case, the output of the conventional system is hard to interpret and is not a high level code that can be executed directly. Also, conventional systems are language specific (i.e., source and target specific) and cannot process codes associated with other languages. Additionally, conventional systems do not have the capability to preserve the functionality of the original application. When a source code is not present, conventional systems do not have the capability to modernize the applications and generate a high level code. As such, there exists a need for a system to decompile binary codes and generate high level codes.

The system of the present invention overcome the above mention problems by decompiling the binary codes and generating a high level code that is ready to be executed. In some embodiments, the binary code may be an open source code. The system of the present invention is not language specific and modernizes applications without having to require any input in some embodiments. Additionally, the system of the present invention identifies vulnerabilities associated with the binary code.

FIG. 1 provides a block diagram illustrating a system environment 100 for efficiently decompiling binary codes, in accordance with an embodiment of the invention. As illustrated in FIG. 1, the environment 100 includes a deterministic decompiler system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200. In some embodiments, the users may be developers that submit one or more software codes to the entity system 200 and/or the deterministic decompiler system 300. In some embodiments, the one or more software codes are binary codes.

The entity system(s) 200 may be any system owned or otherwise controlled by an entity to support or perform one or more process steps described herein. In some embodiments, the entity is a financial institution. In some embodiments, the entity is a non-financial institution.

The deterministic decompiler system 300 is a system of the present invention for performing one or more process steps described herein. In some embodiments, the deterministic decompiler system 300 may be an independent system. In some embodiments, the deterministic decompiler system 300 may be a part of the entity system 200.

The deterministic decompiler system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the deterministic decompiler system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In some embodiments of the present invention, the computing device of the user may be an employee associated with a governance team that oversees the decompiling process. In general, the computing device system 400 communicates with the user 110 via a user interface of the computing device system 400, and in turn is configured to communicate information or instructions with the deterministic decompiler system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution. In some embodiments, the entity system may be operated by any entity that is associated with developing, maintaining, and/or testing software program codes.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a deterministic decompiler application 250, one or more entity applications 270, and a data repository 280 comprising one or more codes 283 submitted by the one or more users via the computing device system. The computer-executable program code of the network server application 240, the deterministic decompiler application 250, the one or more entity application 270 to perform certain logic, data-extraction, and data-storing functions of the entity system 200 described herein, as well as communication functions of the entity system 200.

The network server application 240, the deterministic decompiler application 250, and the one or more entity applications 270 are configured to store data in the data repository 280 or to use the data stored in the data repository 280 when communicating through the network communication interface 210 with the deterministic decompiler system 300, and/or the computing device system 400 to perform one or more process steps described herein. In some embodiments, the entity system 200 may receive instructions from the deterministic decompiler system 300 via the deterministic decompiler application 250 to perform certain operations. The deterministic decompiler application 250 may be provided by the deterministic decompiler system 300. The one or more entity applications 270 may be any of the applications used, created, modified, and/or managed by the entity system 200.

FIG. 3 provides a block diagram illustrating the deterministic decompiler system 300 in greater detail, in accordance with embodiments of the invention. As illustrated in FIG. 3, in one embodiment of the invention, the deterministic decompiler system 300 includes one or more processing devices 320 operatively coupled to a network communication interface 310 and a memory device 330. In certain embodiments, the deterministic decompiler system 300 is operated by a first entity, such as a financial institution, while in other embodiments, the deterministic decompiler system 300 is operated by an entity other than a financial institution. In some embodiments, the deterministic decompiler system 300 is owned or operated by the entity of the entity system 200. In some embodiments, the deterministic decompiler system 300 may be an independent system. In alternate embodiments, the deterministic decompiler system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the deterministic decompiler system 300 described herein. For example, in one embodiment of the deterministic decompiler system 300, the memory device 330 includes, but is not limited to, a network provisioning application 340, a disassembler 350, an encoder 360, a decoder 370, a compiler 375, a residual predictor 380, an iterative residual optimization application 385, and a data repository 390 comprising data processed or accessed by one or more applications in the memory device 330. The computer-executable program code of the network provisioning application 340, the disassembler 350, the encoder 360, the decoder 370, the compiler 375, the residual predictor 380, and the iterative residual optimization application 385 may instruct the processing device 320 to perform certain logic, data-processing, and data-storing functions of the deterministic decompiler system 300 described herein, as well as communication functions of the deterministic decompiler system 300.

The network provisioning application 340, the disassembler 350, the encoder 360, the decoder 370, the compiler 375, the residual predictor 380, and the iterative residual optimization application 385 are configured to invoke or use the data in the data repository 390 when communicating through the network communication interface 310 with the entity system 200, and/or the computing device system 400. In some embodiments, the network provisioning application 340, the disassembler 350, the encoder 360, the decoder 370, the compiler 375, the residual predictor 380, and the iterative residual optimization application 385 may store the data extracted or received from the entity system 200, and the computing device system 400 in the data repository 390. In some embodiments, the network provisioning application 340, the disassembler 350, the encoder 360, the decoder 370, the compiler 375, the residual predictor 380, and the iterative residual optimization application 385 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a deterministic decompiler application 421, entity application 424. These applications also typically comprise instructions to a graphical user interface (GUI) on the display 430 that allows the user 110 to interact with the entity system 200, the deterministic decompiler system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the deterministic decompiler application 421 provided by the deterministic decompiler system 300 allows the user 110 to access the deterministic decompiler system 300. In some embodiments, the entity application 424 provided by the entity system 200 and the deterministic decompiler application 421 allow the user 110 to access the functionalities provided by the deterministic decompiler system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIGS. 5A and 5B provide a flowchart illustrating a process flow for efficiently decompiling binary codes, in accordance with an embodiment of the invention.

As shown in block 505, the system extracts a binary code and one or more inputs associated with the binary code. The or more inputs comprise at least a compiler information associated with the binary code. The compiler associated with the existing binary code is based on the type of operating system that a source code associated with the binary code was executed. For example, the compiler associated with a first operating system generates a binary code with a first file format and the compiler associated with second operating system generates a binary code with a second file format.

As shown in block 510, the system disassembles the binary code into a first assembly language code. Based on the type of the compiler, the system determines a disassembler that is to be used to convert the binary code to the first assembly language code.

As shown in block 515, the system converts the first assembly language code into first set of fixed dimension vectors. The encoder of the system converts the first assembly language code into the first set of fixed dimension vectors. In some embodiments, the encoder of the system employs N-ary Tree Long Short Term Memory (LSTM) networks. LSTM are Recurrent Neural Networks. The encoder employs a hierarchical LSTM, where the LSTM comprises a root LSTM and one or more child LSTM's. In some embodiments, there may be 3 child LSTM's that are responsible for handling different instruction types. The root LSTM identifies input statements associated with the binary code and discards the identified input statements. The root LSTM then divides the other statements associated with the binary code into three instruction types memory, arithmetic, and branch for encoding. The child LSTM configured to handle memory instruction may be capable of storing data in interim variables. The child LSTM configured to handle arithmetic instruction may be capable of performing operations on variables. The child LSTM configured to handle branch instruction may be capable of making decisions.

As shown in block 520, the system generates a skeleton code from the first set of fixed dimension vectors. The system generates the skeleton code via a decoder. In some embodiments, the decoder is a tree based decoder. The decoder validates the syntax and relationship between the skeleton code and corresponding binary code. In some embodiments, the validation is performed in an iterative manner such that no errors are overlooked. The encoding and decoding of the binary code is in the form of a tree.

As shown in block 525, the system compiles the skeleton code. As shown in block 530, the system in response to compiling the skeleton code, determines if compiling the skeleton code resulted in one or more errors. In some embodiments, the one or more errors may be compiling errors. If the compiling did not in one or more errors, the process flow proceeds to block 540. As shown in block 540, the system generates a high level code using the skeleton code.

If the compiling resulted in one or more errors, the process flow proceeds to block 535. As shown in block 535, the system converts the skeleton code to a second assembly language code and a second set of fixed dimension vectors. As shown in block 540, the system compares the second set of fixed dimension vectors with the first set of fixed dimension vectors.

As shown in block 555, the system determines if the second set of fixed dimension vectors match the first set of fixed dimension vectors. If the second set of fixed dimension vectors match the first set of fixed dimension vectors, the process flow proceeds to block 540. In response to determining that the second set of fixed dimension vectors match the first set of fixed dimension vectors, the system generates a high level code using the skeleton code.

If the second set of fixed dimension vectors do not match the first set of fixed dimension vectors, the process flow proceeds to block 550. As shown in block 550, the system optimizes the second set of fixed dimension vectors based on the first set of fixed dimension vectors. As shown in block 560, the system in response to optimizing the second set of fixed dimension vectors, creates a skeleton code associated with the optimized second set of fixed dimension vectors. This process is repeated for 'n' iterations until the skeleton code does not result in any errors when compiled. In some embodiments, users associated with a governance team oversee the decompiling process.

FIG. 6 provides a block diagram illustrating the decompiling process, in accordance with an embodiment of the invention. As shown in block 605, the binary codes are provided as input to the system. The disassembler converts the binary code into assembly code language as shown in block 610. The assembly code language is then provided to the encoder, where the encoder converts the assembly code language to fixed dimension vectors as shown in block 615. An attention layer exists between the encoder and the decoder to improve the accuracy of code generation. The decoder then converts the fixed dimension vectors to a skeleton code as shown in block 620. The generated skeleton code 645 is then passed to the residual engine. The residual engine optimizes the skeleton to code to ensure that the skeleton code does not contain any errors. As shown in block 640, the compiler compiles the generated skeleton code. In the case where the compilation of the skeleton code results in errors, the skeleton code is converted to assembly code language as shown in block 635. The residual predictor compares the fixed dimension vectors generated in block 635 with the fixed dimension vectors generated in block 615 to identify residue. If residue is present, the residual optimizer optimizes the fixed dimension vectors generated in block 635 and generates a skeleton code 655 and passes it back to the compiler for compilation. This residual engine repeats this process for 'n' iterations until the skeleton code does not contain any errors and generates a high level code as shown in block 650.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semi-conductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer implemented method for efficiently decompiling binary codes, wherein the method comprises:
   extracting a binary code and one or more inputs associated with the binary code, wherein the one or more inputs comprise compiler information associated with the binary code;
   determining a disassembler that is to be used for converting the binary code to a first assembly language code based on the compiler information;
   disassembling the binary code into the first assembly language code via the disassembler;
   converting the first assembly language code into first set of fixed dimension vectors;
   generating a skeleton code from the first set of fixed dimension vectors;
   compiling the skeleton code and process to determine one or more errors associated with the skeleton code;
   in response to compiling the skeleton code, determining the one or more errors associated with the skeleton code; and
   correcting the one or more errors associated with the skeleton code, wherein correcting the one or more errors comprises:
      converting the skeleton code to a second assembly language code and a second set of fixed dimension vectors;
      comparing the second set of fixed dimension vectors with the first set of fixed dimension vectors; and
      in response to comparing the second set of fixed dimension vectors with the first set of fixed dimension vectors, determining a mismatch between the second set of fixed dimension vectors and the first set of fixed dimension vectors and optimize the second set of fixed dimension vectors by correcting the mismatch between the second set of fixed dimension vectors and the first set of fixed dimension vectors; and
   repeating the process to determine one or more errors associated with the skeleton code for 'n' iterations until the skeleton code does not comprise any errors and generating a high level code.

2. The computer implemented method of claim 1, wherein compiler information associated with the binary code is based on type of operating system that executed a source code associated with the binary code.

3. The computer implemented method of claim 1, wherein converting the first assembly language code into the first set of fixed dimension vectors is performed via an encoder.

4. The computer implemented method of claim 3, wherein the encoder employs an N-ary Tree Long Short Term Memory (LSTM) networks.

5. The computer implemented method of claim 1, wherein generating the skeleton code is performed via a decoder.

6. The computer implemented method of claim 5, wherein the decoder is a tree based decoder.

7. A system for efficiently decompiling binary codes, the system comprising:
   at least one network communication interface;
   at least one non-transitory storage device; and
   at least one processing device coupled to the at least one non-transitory storage device and the at least one network communication interface, wherein the at least one processing device is configured to:
      extract a binary code and one or more inputs associated with the binary code, wherein the one or more inputs comprise compiler information associated with the binary code;

determine a disassembler that is to be used for converting the binary code to a first assembly language code based on the compiler information;

disassemble the binary code into the first assembly language code via the disassembler;

convert the first assembly language code into first set of fixed dimension vectors;

generate a skeleton code from the first set of fixed dimension vectors;

compile the skeleton code and process to determine one or more errors associated with the skeleton code;

in response to compiling the skeleton code, determine the one or more errors associated with the skeleton code; and correct the one or more errors associated with the skeleton code, wherein correcting the one or more errors comprises:

converting the skeleton code to a second assembly language code and a second set of fixed dimension vectors;

comparing the second set of fixed dimension vectors with the first set of fixed dimension vectors; and in response to comparing the second set of fixed dimension vectors with the first set of fixed dimension vectors, determining a mismatch between the second set of fixed dimension vectors and the first set of fixed dimension vectors and optimize the second set of fixed dimension vectors by correcting the mismatch between the second set of fixed dimension vectors and the first set of fixed dimension vectors; and repeat the process to determine the one or more errors associated with the skeleton code for 'n' iterations until the skeleton code does not comprise any errors and generate a high level code.

8. The system of claim 7, wherein compiler information associated with the binary code is based on type of operating system that executed a source code associated with the binary code.

9. The system of claim 7, wherein the at least one processing device is configured to convert the first assembly language code into the first set of fixed dimension vectors via an encoder.

10. The system of claim 9, wherein the encoder employs an N-ary Tree Long Short Term Memory (LSTM) networks.

11. The system of claim 7, wherein the at least one processing device is configured to generate the skeleton code via a decoder.

12. The system of claim 11, wherein the decoder is a tree based decoder.

13. A computer program product for efficiently decompiling binary codes, the computer program product comprising a non-transitory computer-readable storage medium having computer executable instructions for causing a computer processor to perform the steps of:

extracting a binary code and one or more inputs associated with the binary code, wherein the one or more inputs comprise compiler information associated with the binary code;

determining a disassembler that is to be used for converting the binary code to a first assembly language code based on the compiler information;

disassembling the binary code into the first assembly language code via the disassembler;

converting the first assembly language code into first set of fixed dimension vectors;

generating a skeleton code from the first set of fixed dimension vectors;

compiling the skeleton code and process to determine one or more errors associated with the skeleton code;

in response to compiling the skeleton code, determining the one or more errors associated with the skeleton code; and correcting the one or more errors associated with the skeleton code, wherein correcting the one or more errors comprises:

converting the skeleton code to a second assembly language code and a second set of fixed dimension vectors;

comparing the second set of fixed dimension vectors with the first set of fixed dimension vectors; and in response to comparing the second set of fixed dimension vectors with the first set of fixed dimension vectors, determining a mismatch between the second set of fixed dimension vectors and the first set of fixed dimension vectors and optimize the second set of fixed dimension vectors by correcting the mismatch between the second set of fixed dimension vectors and the first set of fixed dimension vectors; and repeating the process to determine the one or more errors associated with the skeleton code for 'n' iterations until the skeleton code does not comprise any errors and generating a high level code.

14. The computer program product of claim 13, wherein compiler information associated with the binary code is based on type of operating system that executed a source code associated with the binary code.

15. The computer program product of claim 13, wherein the computer executable instructions cause the computer processor to convert the first assembly language code into the first set of fixed dimension vectors via an encoder.

16. The computer program product of claim 15, wherein the encoder employs an N-ary Tree Long Short Term Memory (LSTM) networks.

17. The computer program product of claim 13, wherein the computer executable instructions cause the computer processor to generate the skeleton code via a decoder.

18. The computer program product of claim 17, wherein the decoder is a tree based decoder.

* * * * *